O. A. SMITH.
HUB NUT AND METHOD OF MAKING THE SAME.
APPLICATION FILED FEB. 28, 1920.

1,381,437.                                  Patented June 14, 1921.

Inventor
Oscar A. Smith.
By his Attorney

UNITED STATES PATENT OFFICE.

OSCAR A. SMITH, OF CLEVELAND, OHIO, ASSIGNOR TO THE NATIONAL ACME COMPANY, OF CLEVELAND, OHIO, A CORPORATION OF OHIO.

HUB-NUT AND METHOD OF MAKING THE SAME.

1,381,437.

Specification of Letters Patent.  Patented June 14, 1921.

Application filed February 28, 1920. Serial No. 361,955.

*To all whom it may concern:*

Be it known that I, OSCAR A. SMITH, a citizen of the United States, residing at Cleveland, in the county of Cuyahoga and State of Ohio, have invented certain new and useful Improvements in Hub-Nuts and Methods of Making the Same, of which the following is a specification.

This invention relates to nuts, and more particularly hub nuts adapted for use with steel disk automobile wheels, the object of the invention being to provide an improved nut of this character, and method of forming the same whereby the cost of producing such nut is materially decreased, and which at the same time will be simple in construction and effective in use.

Figure 1:
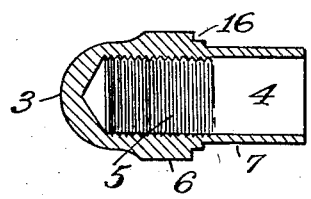
Figures 2, 3:
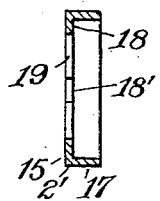
Figure 4:
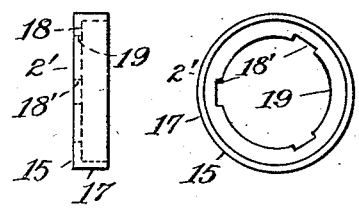
Figure 5:
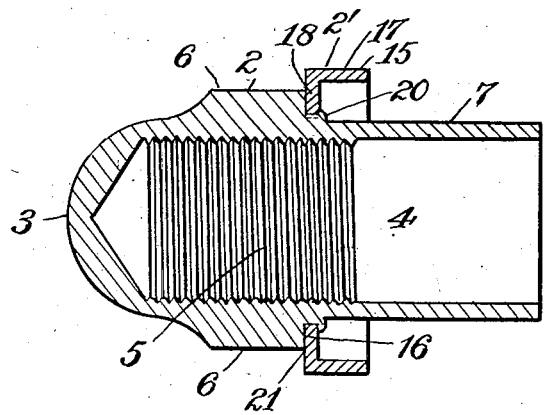
Figure 6:
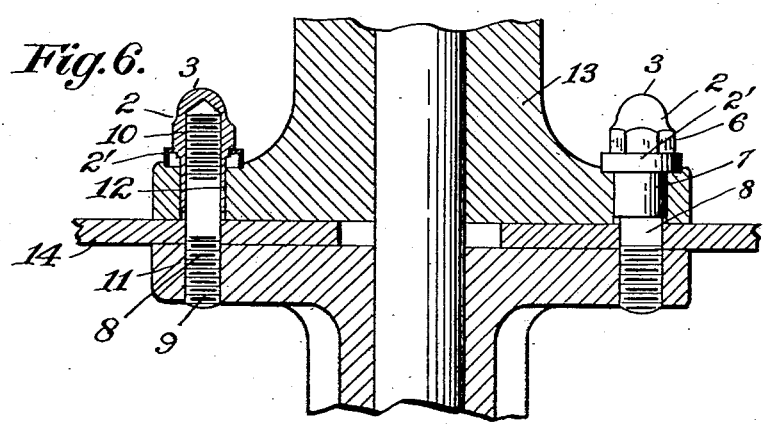

In the drawings accompanying and forming a part of this specification, Figure 1 is a longitudinal sectional view of one part of this improved nut; Fig. 2 is a sectional view of another part thereof; Fig. 3 is a side view of the member shown in Fig. 2; Fig. 4 is a front view of the member shown in Fig. 2; Fig. 5 is an enlarged sectional view of the members shown in Figs. 1 and 2 assembled; and Fig. 6 is a sectional view of a portion of a steel disk automobile wheel illustrating the manner in which the steel disk and the hub members of the wheel are all secured together by this improved hub nut, one of which is shown in elevation and another in section.

Similar characters of reference indicate corresponding parts in the several figures of the drawings.

It has been the practice heretofore in making nuts of this kind, to make the same from a solid round bar, but this mode of procedure requires a bar as large as the largest diameter of the nut and as the cup-shaped portion thereof is of greater diameter than any other portion of the nut, it follows that when the nut is made from a solid bar a large portion of the material at each side of the cup-shaped portion of the nut must be cut away and is wasted, and this waste together with the fact that it requires considerable time to cut away such a large proportion of the material in order to reduce the various portions of the nut to the required size, makes the formation of the nut from a solid bar a very expensive mode of procedure. In fact, the making of a nut from a solid bar requires substantially one-third more steel than is necessary in making my improved nut, and as these nuts are made on an automatic multiple spindle screw machine, it has been found by actual test that the production of that machine is increased 100% by making the nut in the improved manner herein set forth, as compared with the old way of making the nut.

Moreover, by making the nut in the manner hereinafter described it enables the hexagon wrench-receiving portion to be milled at one-third less cost than was heretofore necessary to do this work from a solid bar, and the cost of the present improved product is not increased by reason of the spinning or stamping of the cup-shaped portion of the nut to the body thereof, owing to the fact that this just about offsets the cost of burring, which was heretofore necessary after the nut made from the solid bar had gone through the hexagon milling operation, so that it has been found in practice by actual test that the present improved nut can be produced from 30% to 35% cheaper than it was heretofore possible when the nut was made from a solid bar.

In making this improved nut, it is only necessary to use a hexagon bar of substantially the size of the wrench-receiving or hexagon portion of the nut, since it is not necessary to cut away the bar to form this hexagon portion as has heretofore been necessary when the nut has been made from a solid bar. The nut 2 is suitably shaped as at 3 to form an ornamental end and suitably bored as at 4, and interiorly threaded as at 5, it having on its exterior a wrench-receiving or hexagon portion 6 and is shaped to have a reduced portion 7. The threaded bore is intended for the reception of the connecting stud 8, which in the present instance is shown threaded at both ends as 9 and 10, the threaded end 9 projecting into the threaded bore of one hub member 11 of the wheel while the opposite threaded end 10 of the stud extends into the threaded bore 5 of the hub nut. The tubular or sleeve portion 7 of the nut extends into an opening or bore 12 of the other hub member 13 while the stud 8 passes through the steel disk 14 of the wheel and by drawing up the hub nut the steel disk is clamped between the two hub members 11 and 13 in a manner which will be readily understood. Located on the hub nut is a cup-shaped member 15 for the reception of a split washer.

The present improvement has therefore to do with the manufacture of this improved hub nut in an economical manner from a hexagon bar of stock materially smaller in size than has heretofore been necessary, and to do this the nut is formed as a two-part member, but the parts are so connected together that to all intents and purposes they are an integral structure and in making this improved nut the body portion 2 hereinbefore described is provided with a step or shoulder 16, which in the present instance is formed by providing the body with a stepped portion as it were, stepping up from the tubular portion 7 or stepping down from the wrench-receiving portion 6 whereby a wall is formed against which the cup-shaped flange hereinafter described will be clamped. The body portion 2 forms one member of the two-part nut. The cup-shaped portion 2' constitutes the other member of the nut and is formed separately from the body portion 2, and can either be made from a round bar or pressed sheet steel in the manner shown. This cup-shaped portion comprises a flange 17 having an inwardly extending flange 18 provided with an opening or bore 19 of a size adapted to fit over the shoulder 16 of the body 2 of the nut, and this inwardly extending flange 18 is provided with one or more (shown herein as three in number) notches or recesses 18' forming what I have termed as anchoring stations to assist in anchoring the cup member, and thus secure it to the body 2 of the nut, and prevent circular movement of one part relatively to the other.

After the cup member 2' is assembled on the body 2 of the nut in the manner shown in Fig. 5, the forward edge of the shoulder which has somewhat greater length than the width of the flange 18 of the cup member, is forced by pressing or peening or stamping or spinning it over the forward face of the flange 18 as at 20, Fig. 5, which not only prevents the separation of the two members longitudinally of the body but also clamps the flange 18 against the wall 21 of the body, which is one of the results of the stepped formation of the body of the nut and at the same time a portion of this pressed metal 20 will enter the notches or recesses 18' and thus prevent the circumferential turning of the cup relatively to the body or vice versa, thus effectively anchoring the cup to the body in a very efficient and rigid manner.

It follows by this mode of procedure in manufacturing this improved hub nut, that it is not necessary as heretofore, when the entire nut is made from a solid bar of stock, to have the body portion of the same diameter as the cup-shaped portion 2' and then waste the material by cutting it away to reduce the body portion to form the tubular portion 7 and the hexagonal portion 2. On the contrary it is only necessary to use a steel bar of substantially the diameter of the hexagonal portion and then shape it automaticaly to form the body shown in Fig. 1. Consequently a great saving in time in producing the nut is obtained and a great waste of material avoided since it will be obvious that when the whole nut is formed from a solid bar that as the cup-shaped portion is materially larger in diameter than any other portion of the nut, it follows that in order to properly shape the nut a large portion of the nut at both sides of the cup-shaped member had to be cut away and as this material had to be cut away in the form of chips, it follows that it was simply waste material aside from the time and labor required to cut away all of this waste material, which made the production of the nut as hereinbefore stated, a very expensive one in that it required the use of large stock of the size of the extreme diameter or cup-portion of the nut, whereas by means of the present improvement, the nut body can be made by using stock very much smaller in diameter than the extreme diameter of the cup-shaped member while the cup-shaped member can be pressed from steel so that there is very much less waste in forming the nut in this improved manner than was heretofore the case.

In short, instead of using a solid bar of the extreme diameter of the cup-shaped portion of the nut and then cutting it down to less diameter at one side of the cup to form the hex portion and at the other side of the cup to form the tubular portion of the nut, as heretofore, this improvement permits the use of a hex bar of substantially the diameter of the hexagonal or wrench-receiving portion, so that no substantial part of the hexagonal part of the bar has to be cut away because the hexagonal stock or bar is supplied to the manufacturer in this form, and at the opposite side of the cup-shaped portion very much less material has likewise to be cut away in order to form the tubular portion 7. Furthermore, this tubular portion 7 can be more readily formed as can also be the cup-shaped portion before these parts are assembled.

It will be understood that the various details may be more or less changed without departing from the spirit or scope of the present invention, as for instance, it is not material as to the particular manner in which the shoulder 20 is forced into engagement with the flange 18 of the cup member, as any suitable and practical way may be used, nor is it material as to the number of notches or recesses which the cup member may have or the form thereof.

I claim as my invention:

1. A two-part nut comprising a body member and a flange member assembled and rigidly interlocked therewith by forcing a portion of the metal of one member beyond the normal face thereof into and also against the face of the other member thereby to prevent movement of the same in a plurality of directions.

2. A two-part nut comprising a body member and a flange member assembled and interlocked therewith by forcing a portion of the metal of the body member beyond the normal face thereof into the edge and also against the face of the flange member, thereby to prevent movement of the same in a plurality of directions.

3. A two-part nut comprising a body member, and a cup-shaped member having an inwardly extending flange provided with one or more notches and assembled with the body member and secured thereto by forcing the metal of the body member into engagement with the flange of the cup-shaped member and into each of said notches thereby to keep the members rigidly together.

4. A two-part nut comprising a body member having a wrench-receiving portion, a tubular portion, and a shoulder, a cup-shaped member having an inwardly extending flange provided with one or more notches and located on said shoulder and secured to the body by forcing the metal of the shoulder into engagement with the cup flange and into each of said notches thereby to keep the members rigidly together.

5. A two-part nut comprising a body member having a stepped portion forming a shoulder, and a member adapted to fit said shoulder and secured to said body member by forcing a portion of the metal of the shoulder beyond the normal face thereof into the edge and also against the face of said second member, thereby to clamp the latter against a wall of the body member.

6. A nut comprising a body member having a wrench-receiving portion, interior threads and a tubular portion, a flanged member located on said body and secured thereto by forcing a part of one of said members into engagement with the other.

7. A nut comprising a body member having a wrench-receiving portion and a shoulder of less diameter than said wrench-receiving portion, and a cup member fitting said shoulder and secured thereon by a portion of the metal of the body member extending beyond the normal face of said body member and engaging the face and projecting into the edge of the cup member.

8. A nut comprising a body member having an interiorly threaded bore, a wrench-receiving portion, and a shoulder of less diameter than said wrench-receiving portion, a cup member assembled on said shoulder and provided with one or more anchoring stations, said body member having a part thereof forced into engagement with the cup member and into each anchoring station thereby to prevent longitudinal and circumferential movement of the cup member relatively to the body member.

9. A hub nut comprising a body member having an interiorly bored portion terminating in a smooth bore, a wrench-receiving portion, and a shoulder of less diameter than said wrench-receiving portion, a cup member having an inwardly extending flange of less width than the length of said shoulder and having a bore adapted to fit said shoulder, said body having a portion of said shoulder forced into engagement with the inwardly extending flange of the cup thereby to prevent displacement of the latter relatively to the nut body.

10. A hub nut comprising a body member having an interiorly bored portion terminating in a smooth bore, a wrench-receiving portion, and a shoulder of less diameter than wrench-receiving portion, a cup member having an inwardly extending flange of less width than the length of said shoulder and having a bore adapted to fit said shoulder, said body having a portion of said shoulder forced into engagement with the inwardly extending flange of the cup thereby to prevent displacement of the latter relatively to the nut body, said inwardly extending flange having one or more notches and into which notches the forced metal of the shoulder extends.

11. A nut comprising a body member having a wrench-receiving portion of less diameter than the extreme diameter of the completed nut, interior threads and a tubular portion and also having at the juncture point of said wrench-receiving portion and tubular portion a shoulder, and a flanged member located on said shoulder and secured to said body by forcing a part of the shoulder into engagement with said flanged member.

12. A nut comprising a body member having a wrench-receiving portion of less diameter than the extreme diameter of the completed nut and having threads and a tubular portion and also having at the juncture point of said wrench-receiving portion and tubular portion a shoulder, and a flanged member located on said shoulder and having one or more notches and secured to said body by forcing a part of the shoulder into engagement with said flanged member.

13. A nut comprising a body member having a wrench-receiving portion of less diameter than the extreme diameter of the completed nut and having threads and a tubular portion and also having at the juncture point of said wrench-receiving portion and tubular portion a shoulder, and a flanged member located on said shoulder and secured to said body by forcing a part of one of said members into engagement with the other.

14. A nut comprising a body member having a wrench-receiving portion of less diameter than the extreme diameter of the completed nut and having threads and a tubular portion and also having at the juncture point of said wrench-receiving portion and tubular portion a shoulder of greater diameter than said tubular portion but of less diameter than said wrench-receiving portion, a flanged cup-shaped member having one or more notches in its flange and located on said shoulder and secured to the body by forcing a part of the shoulder into engagement with said cup-shaped member and into the notches thereof.

15. The method of making a two-part nut, which consists in forming a body member and a separate flange member adapted to fit a portion of the body member, and then interlocking said members together by forcing a portion of the metal of one member into a recess of and against the face of the other member.

16. The method of making a two-part nut, which consists in forming a body member having a shoulder and forming a second member having a bore adapted to fit said shoulder and securing said members together by forcing a portion of the metal of the shoulder beyond its normal face into the edge of and also into engagement with the face of said cup-shaped member.

17. The method of making a two-part nut, which consists in forming a body member with a stepped portion forming a shoulder, and forming a cup-shaped member adapted to fit said shoulder and providing said cup-shaped member with one or more notches, and then securing the two members together by forcing the metal of the shoulder into engagement with the cup-shaped member and into each of said notches thereby to clamp the cup-shaped member against a wall of the body member.

18. The method of making nuts, which consists in forming from a bar of stock a body member with a threaded interior, and a wrench-receiving portion of less diameter than the extreme diameter of the completed nut, and then assembling on said body member a separately formed member and interlocking it with the body member by forcing the metal of one part into engagement with the other part.

19. The method of making nuts, which consists in forming from a bar of stock a body member with a threaded interior and a tubular portion, and a wrench-receiving portion of less diameter than the extreme diameter of the completed nut and then assembling on said body member a separately formed member and securing it to the body member by forcing the metal of the latter into engagement with the former independently of the tubular portion.

20. The method of making nuts, which consists in forming from a bar of stock a body member with a threaded interior and a tubular portion, and a wrench-receiving portion of less diameter than the extreme diameter of the completed nut, and then assembling on said body member a separately formed cup-shaped member and securing it to the body member by forcing the metal of the body member into engagement with the cup-shaped member independently of the tubular portion.

21. The method of making nuts, which consists in forming from a bar of stock a body member with a threaded interior, and a wrench-receiving portion of less diameter than the extreme diameter of the completed nut, and then assembling on said body member a separately formed cup-shaped member having one or more notches and securing it to the body member by forcing the metal of said body member into engagement with the cup-shaped member and into each of said notches.

22. The method of making nuts, which consists in forming from a bar of stock a body member with a threaded interior, and a wrench-receiving portion of less diameter than the extreme diameter of the completed nut, said body also having a shoulder of less diameter than the wrench-receiving portion of the body, and then assembling on said shoulder a separately formed cup-shaped member and securing it to the body member by forcing the metal of the shoulder into engagement with said cup-shaped member.

23. The method of making nuts, which consists in forming from a bar of stock a body member with a threaded interior, and a wrench-receiving portion of less diameter than the extreme diameter of the completed nut, said body member also having a shoulder of less diameter than said wrench-receiving portion, and then assembling on said shoulder a separately formed cup-shaped member having an inwardly extending flange of less width than the length of the shoulder and then securing said cup-shaped member to the body member by forcing the metal of the latter into engagement with said cup-shaped member.

24. The method of making nuts, which consists in forming a body member from a bar of stock with a threaded interior, and a wrench-receiving portion of less diameter than the extreme diameter of the completed nut, said body member also having a shoulder of less diameter than the wrench-receiving portion, and then assembling on said body member a separately formed pressed metal cup-shaped member having an inwardly extending flange provided with one or more notches, said flange having less width than the length of the shoulder and then securing said cup-shaped member to the body member by forcing the metal of the shoulder into engagement with said inwardly extending flange of the cup-shaped member and into each of said notches.

25. The method of making nuts, which consists in forming a body member from a bar of stock with a wrench-receiving, interiorly threaded portion terminating in a tubular interiorly smooth bore portion having an exterior diameter less than the diameter of the wrench-receiving portion, which latter diameter is less than the extreme diameter of the completed nut, said tubular portion and wrench-receiving portion having therebetween a shoulder of greater diameter than the tubular portion but of less diameter than the wrench-receiving portion, then assembling on said shoulder a separately formed cup-shaped member having an inwardly extending flange of less width than the length of said shoulder and then forcing the metal of said shoulder into engagement with the inwardly extending flange of said cup-shaped member.

26. The method of making nuts, which consists in forming a body member from a hexagonal bar of stock and providing it with an interiorly threaded portion terminating in a tubular interiorly smooth bore portion having an exterior diameter less than the diameter of the hexagonal portion, which latter diameter is less than the extreme diameter of the completed nut, said tubular portion and hexagonal portion having therebetween a shoulder of greater diameter than the tubular portion but of less diameter than the hexagonal portion, then assembling on said shoulder a separately formed cup-shaped member having an inwardly extending flange of less width than the length of said shoulder and then forcing the metal of said shoulder into engagement with the inwardly extending flange of said cup-shaped member, said inwardly extending flange also having one or more notches into which the metal of the shoulder is also forced.

27. A two-part nut comprising a body member, and a member rigidly secured thereto by projecting a portion of one member beyond its normal face into and also against the face of the other member thereby to interlock said members together.

28. A two part nut comprising a threaded body member having an elongated tubular portion and a wrench receiving portion, and a separately formed member secured thereto.

29. A two part nut comprising a threaded body member having an elongated tubular portion and a wrench receiving portion, and a cup-shaped member rigidly secured thereto.

Signed at Cleveland, Cuyahoga county, Ohio, this 24th day of February, 1920.

OSCAR A. SMITH.